United States Patent

Lüer et al.

[11] Patent Number: 6,156,862
[45] Date of Patent: Dec. 5, 2000

[54] HEAT-HARDENABLE PAINT COMPOSITIONS

[75] Inventors: Ingo Lüer, Veitshöchheim, Germany; Kishio Shibatoh; Akito Nukita, both of Kanagawa, Japan

[73] Assignee: BASF Coatings AG, Muenster-Hiltrup, Germany

[21] Appl. No.: 09/230,912

[22] PCT Filed: Jul. 29, 1997

[86] PCT No.: PCT/EP97/04111

§ 371 Date: Feb. 3, 1999

§ 102(e) Date: Feb. 3, 1999

[87] PCT Pub. No.: WO98/07796

PCT Pub. Date: Feb. 26, 1998

[30] Foreign Application Priority Data

Aug. 22, 1996 [JP] Japan ................................ 8-221552

[51] Int. Cl.$^7$ .................................................. C08F 118/00
[52] U.S. Cl. ........................... 526/320; 526/301; 526/310; 526/321; 526/322; 526/323.1; 526/323.2; 526/328; 526/328.5
[58] Field of Search ..................... 526/301, 310, 526/320, 321, 322, 323.1, 323.2, 328, 328.5

[56] References Cited

U.S. PATENT DOCUMENTS

| | | | |
|---|---|---|---|
| 5,574,103 | 11/1996 | Wu et al. | 525/127 |
| 5,726,254 | 3/1998 | Wu et al. | 525/375 |

FOREIGN PATENT DOCUMENTS

| | | | |
|---|---|---|---|
| 0 604 922 A1 | 12/1993 | European Pat. Off. | C08K 5/3492 |
| 2-305873 | 12/1990 | Japan | C09D 175/04 |
| 6-228305 | 8/1994 | Japan | C08G 71/04 |

*Primary Examiner*—Helen L. Pezzuto

[57] ABSTRACT

The invention relates to heat-hardenable paint composition which contains (A) vinyl based copolymer of hydroxyl group value from 20 to 200 mg KOH/g, being a copolymer of from 5 to 70 wt % hydroxyl group containing a particularly defined vinyl based monomer and from 95 to 30 wt % other vinyl based monomer (a-2), and (B), a particularly defined 1,3,5-triazine-2,4,6-triscarbamic acid ester, or an oligomer thereof, in which the mol ratio of hydroxyl groups originating from the aforementioned (A) component: NHCOOR groups originating from the aforementioned (B) component in the composition is from 1:3 to 3:1.

2 Claims, No Drawings

HEAT-HARDENABLE PAINT COMPOSITIONS

FIELD OF THE INVENTION

This invention concerns heat-hardenable paint compositions and, more precisely, it concerns heat-hardenable paint compositions which are suitable as top-coat paints for use on automobiles.

BACKGROUND OF THE INVENTION

In recent years, the deterioration in the external appearance of paint films due to chemical and physical causes, such as etching by acid rain and scratching during cleaning of the paint film for example, has been seen as a problem in the field of automobile paints, for example.

Acrylic-melamine based top-coat paint compositions in which ε-caprolactone modified acrylic resin and specified low molecular weight polyols are used conjointly in the essential structural material of the paint film and in which soft segments are introduced by hardening with an alkoxy monomeric melamine (for example, Japanese Patent Kokai 64-66274, (1989)) have been suggested as a means of resolving these problems.

However, the abovementioned paint compositions are such that the paint film forming resin itself is modified with ε-caprolactone and so the paint film is softened and the scratch resistance can be improved, but the acid resistance is inadequate because alkoxy monomeric melamine is used, and this is inappropriate for dealing with severe acid rain in the future.

Furthermore, top-coat paint compositions which have ε-caprolactone modified acrylic resin and non-yellowing type blocked polyisocyanate compounds as essential components (for example, Japanese Patent Kokai H2-305873 (1990)) have also been suggested with the same end in view.

However, although both scratching resistance and acid resistance are improved with the abovementioned compositions, a blocked isocyanate compound is used for the crosslinking agent and so the paint film in fact liable to yellowing even though it is said to be a non-yellowing type, and in practice the non-yellowing properties are inadequate.

On the other hand, hardenable compositions which contain poly-functional hydroxyl group containing materials, 1,3,5-triazine-2,4,6-tris-carbamic acid esters, and acid hardening catalysts have been disclosed in Japanese Patent Kokai H6-228305 (1994), and it is stated that paint films which release little formaldehyde and which have excellent acid resistance are obtained.

However, these compositions are inadequate in terms of weather resistance and thermal stability, and paint film defects such as cracking and loss of gloss due to exposure to ultraviolet radiation are liable to occur with paint films which have been formed under hardening conditions of temperature above 140° C. in particular.

The aim of this invention is to provide heat-hardenable paint compositions with which paint films which have excellent scratching resistance, acid resistance, yellowing resistance and weather resistance can be formed in order to resolve the problems outlined above.

SUMMARY OF THE INVENTION

The present invention provides the following heat-hardenable paint compositions:

(1) Heat-hardenable paint composition which contains (A) vinyl based copolymer of hydroxyl group value from 20 to 200 mg KOH/g, being a copolymer of from 5 to 70 wt % hydroxyl group containing vinyl based monomer (a-1) which can be represented by general formula (1) which is indicated below and from 95 to 30 wt % other vinyl based monomer (a-2), and (B) 1,3,5-triazine-2,4,6-triscarbamic acid ester which can be represented by the general formula (2) which is indicated below, or an oligomer thereof, characterized in that the mol ratio of hydroxyl groups originating from the aforementioned (A) component: NHCOOR groups originating from the aforementioned (B) component in the composition is from 1:3 to 3:1.

General Formula (1)

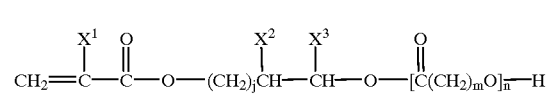

(In this formula, $X^1$, $X^2$ and $X^3$ each independently represent a hydrogen atom or a methyl group. Moreover j is an integer of value from 0 to 2, m is an integer of value from 3 to 5, and n is an integer of value from 0 to 5. However, j and n cannot both be 0.)

General Formula (2)

(In this formula, R represents an alkyl group which has from 1 to 20 carbon atoms, an aryl group which has from 6 to 20 carbon atoms or an aralkyl group which has from 7 to 20 carbon atoms, and these groups may be the same or different.)

(2) Heat-hardenable paint composition which contains (C) vinyl based copolymer of hydroxyl group value from 20 to 200 mg KOH/g, being a copolymer which contains from 5 to 70 wt % structural units (c-1) which can be represented by general formula (3) which is indicated below and from 95 to 30 wt % other structural units (c-2) derived from vinyl based monomer, and (B) 1,3,5-triazine-2,4,6-triscarbamic acid ester which can be represented by the general formula (2) which is indicated below, or an oligomer thereof, characterized in that the mol ratio of hydroxyl groups originating from the aforementioned (C) component: NHCOOR groups originating from the aforementioned (B) component in the composition is from 1:3 to 3:1.

General Formula (3)

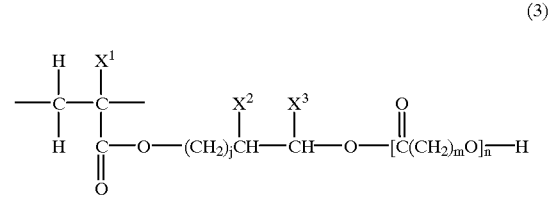

(In this formula, $X^1$, $X^2$ and $X^3$ each independently represent a hydrogen atom or a methyl group. Moreover j is an integer of value from 0 to 2, m is an integer of value from 3 to 5, and n is an integer of value from 0 to 5. However, j and n cannot both be 0.)

General Formula (2)

(In this formula, R represents an alkyl group which has from 1 to 20 carbon atoms, an aryl group which has from 6 to 20 carbon atoms or an aralkyl group which has from 7 to 20 carbon atoms, and these groups may be the same or different.)

In this invention, the term "(meth)acrylic" signifies "acrylic" and/or "methacrylic".

$X^1$, $X^2$ and $X^3$ in the aforementioned general formula (1) or (3) are hydrogen atoms or methyl groups, and they may be the same or different. Furthermore, j is an integer of value from 0 to 2, m is an integer of value from 3 to 5 and n is an integer of value from 0 to 5. However, j and n cannot both be 0 at the same time. If n exceeds 5 then the solvent resistance of the paint film obtained is reduced and so this is undesirable.

DETAILED DESCRIPTION OF THE INVENTION

Actual examples of the aforementioned hydroxyl group containing monomers which can be represented by general formula (1) include hydroxypropyl (meth)acrylate and hydroxybutyl (meth)acrylate, for example, as monomers in which n is 0, and the lactone modified vinyl based monomers where a lactone has been added to a hydroxyl group containing vinyl based monomer, such as hydroxyethyl (meth)acrylate, hydroxypropyl (meth)acrylate or hydroxybutyl (meth)acrylate for example, as monomers in which n is from 1 to 5.

$\epsilon$-Caprolactone, $\beta$-methyl-$\delta$-valerolactone, $\gamma$-valerolactone, $\delta$-valerolactone, $\delta$-caprolactone, $\gamma$-caprolactone, $\beta$-propiolactone and $\gamma$-butyrolactone, for example, can be cited for the abovementioned lactones.

The aforementioned lactone modified vinyl based monomers can be manufactured by adding from 1 to 5 mol of the abovementioned lactones to 1 mol of the aforementioned hydroxyl group containing vinyl based monomers. If, in this case, the lactones are added in an amount exceeding 5 mol then the solvent resistance after paint film formation is poor and this is undesirable. The method whereby $\epsilon$-caprolactone is reacted in the presence of a catalyst with a hydroxy group containing vinyl based monomer, as disclosed in Japanese Patent Kokai 63-118317 (1988) for example, and other known methods, can be adopted for the method of addition.

Commercial products can be used for the aforementioned hydroxyl group containing vinyl based monomer (a-1) which can be represented by the general formula (1) and, for example, "Praxel" manufactured by the Daiseru Kagaku Co. or "TONE" manufactured by the Union Carbide Co. (both trade names) can be used as lactone modified vinyl based monomers.

A single type of hydroxyl group containing vinyl based monomer (a-1) can be used alone, or two or more types can be used in combination.

$C_{1-18}$ alkyl or cycloalkyl esters of (meth)acrylic acid, such as methyl (meth)acrylate, ethyl (meth)acrylate, propyl (meth)acrylate, n-butyl (meth)acrylate, i-butyl (meth) acrylate, t-butyl (meth)acrylate, 2-ethylhexyl (meth) acrylate, cyclohexyl (meth)acrylate, n-octyl (meth)acrylate, lauryl (meth)acrylate, tridecyl (meth)acrylate and stearyl (meth)acrylate; and also styrene, styrene derivatives, acrylonitrile, acrylamide, vinyltoluene, vinyl acetate, glycidyl (meth)acrylate, acrylic acid, methacrylic acid and 2-hydroxyethyl (meth)acrylate, for example, can be cited as other vinyl based monomers (a-2) which can be copolymerized with the hydroxyl group containing vinyl based monomer (a-1).

One of the other vinyl based monomers (a-2) can be used alone, or two or more types can be used in combination.

In this invention, the vinyl based copolymer which is used for component (A) is a copolymer of from 5 to 70 wt %, and preferably from 10 to 60 wt %, hydroxy group containing vinyl based monomer (a-1) which can be represented by the aforementioned general formula (1) and from 95 to 30 wt %, and preferably from 90 to 40 wt %, of the other vinyl based monomer (a-2). In those cases where the proportion of hydroxyl group containing vinyl based monomer (a-1) is less than 5 wt % the scratching resistance of the paint film is inadequate, and if the amount exceeds 70 wt % then the hardness of the paint film is inadequate and the solvent resistance is reduced and so this is undesirable.

The hydroxyl group value of the vinyl based copolymer (A) used in the invention is from 20 to 200 mg KOH/g, and preferably from 40 to 180 mg KOH/g. In those cases where the hydroxyl group value is less than 20 mg KOH/g the solvent resistance of the hardened paint film is reduced, and in those cases where it exceeds 200 mg KOH/g the flex resistance of the hardened paint film is reduced and so this is undesirable.

The vinyl based copolymer (A) is obtained by copolymerizing the aforementioned hydroxyl group containing vinyl based monomer (a-1) and the other vinyl based monomer (a-2). Known methods can be used for the polymerization, and polymerization methods such as solution polymerization, non-aqueous dispersion polymerization and bulk polymerization, for example, can be adopted, and solution polymerization is especially desirable.

In this invention, the vinyl based copolymer which is used as the (C) component is a copolymer which contains from 5 to 70 wt %, and preferably from 10 to 60 wt %, of structural units (c-1) which can be represented by the aforementioned general formula (3) and from 95 to 30 wt %, and preferably from 90 to 40 wt %, of other structural units (c-2) which are derived from vinyl based monomer. In those cases where the proportion of structural units (c-1) is less than 5 wt % the scratching resistance of the paint film is inadequate, and if it exceeds 70 wt % then the hardness of the paint film is inadequate and the solvent resistance is reduced and so this is undesirable.

Furthermore, the hydroxyl group value of the vinyl based copolymer (C) used in the invention is from 20 to 200 mg KOH/g, and preferably from 40 to 180 mg KOH/g. In those cases where the hydroxyl group value is less than 20 mg KOH/g the solvent resistance of the hardened paint film is reduced, and in those cases where it exceeds 200 mg KOH/g the flex resistance of the hardened paint film is reduced, and so this is undesirable.

The structural units (c-1) represented by the aforementioned general formula (3) are structural units derived from hydroxyl group containing vinyl based monomers (a-1) which can be represented by the aforementioned general formula (1), and they are also structural units which are derived by adding lactones to the vinyl based monomers which contain hydroxyl groups as will be described hereinafter. Furthermore, the structural units (c-2) are structural units derived from the aforementioned other vinyl based monomers (a-2), and they have a structure which can be represented by general formula (4) below.

General Formula 4

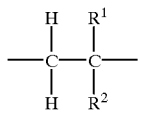

(4)

(In this formula, $R^1$ is a hydrogen atom or a methyl group, and $R^2$ is the residual group of the other vinyl based monomer (a-2).)

The vinyl based copolymer (C), as in the case of the vinyl based copolymer (A), is obtained by copolymerizing the aforementioned hydroxyl group containing vinyl based monomer (a-1) and the other vinyl based monomer (a-2). Furthermore, it can be obtained by adding the aforementioned lactones to the hydroxyl groups of the copolymer after obtaining the vinyl based copolymer which contains hydroxyl groups by copolymerizing a vinyl based monomer which contains hydroxyl group, such as hydroxypropyl (meth)acrylate, hydroxybutyl (meth)acrylate or hydroxyethyl (meth)acrylate for example, and the aforementioned other vinyl based monomer (a-2).

The known methods can be adopted for the addition of lactones and, for example, the method in which the aforementioned lactones are dripped into and mixed with a solution of the copolymer in the presence of an organometallic compound catalyst, such as dibutyltin dilaurate or tetrabutyltitanate for example, or an acid such as carboxylic acid, phosphoric acid or sulfonic acid, and a ring-opening addition reaction carried out at a temperature of from 80 to 160° C. can be used.

The (B) component used in the invention is a crosslinking component, and a 1,3,5-triazine-2,4,6-triscarbamic acid ester which can be represented by the aforementioned general formula (2), an oligomer thereof, or a mixture of these can be used.

Alkyl groups which have from 1 to 20 carbon atoms, such as the methyl, ethyl, n-propyl, isopropyl, n-butyl, isobutyl, sec-butyl, tert-butyl, pentyl, hexyl, heptyl, octyl, nonyl, decyl, undecyl, dodecyl, tetradecyl, heptadecyl and eicosyl groups; aryl groups which have from 6 to 20 carbon atoms, such as the phenyl, tolyl, naphthyl and anthryl groups and the substituted aryl groups where alkyl group have been substituted on the aromatic rings of these groups; and aralkyl groups which have from 7 to 20 carbon atoms such as the benzyl and phenethyl groups and the substituted aralkyl groups where alkyl groups have been substituted in the aromatic rings of these groups, can be cited as actual examples of R in the aforementioned general formula (2).

The R groups in the aforementioned general formula (2) may be the same or different.

From among the 1,3,5-triazine-2,4,6-triscarbamic acid esters which can be represented by the aforementioned general formula (2), the compounds in which R is an alkyl group which has from 1 to 8 carbon atoms are preferred, and 2,4,6-tris(methoxycarbonylamino)-1,3,5-triazine which can be represented by $C_3N_3(NHCOOCH_3)_3$, 2,4,6-tris(butoxycarbonylamino)-1,3,5-triazine which can be represented by $C_3N_3(NHCOOC_4H_9)_3$, and mixtures of these, are especially desirable.

Furthermore, oligomers where compounds which can be represented by general formula (2) have been partially condensed with diols can also be used for the (B) component. Examples of the diols which can be used here include ethylene glycol, diethylene glycol, propylene glycol, propanediol, butanediol, pentanediol, hexanediol and neopentyl glycol.

The compounding proportions of the (A) component (or (C) component) and the (B) component are such that the mol ratio of hydroxyl groups originating from the (A) component (or (C) component): NHCOOR groups originating from the (B) component is from 1:3 to 3:1, and preferably from 1:2 to 2:1.

The solvent resistance of the hardened paint film is reduced in those cases where the abovementioned mol ratio is below 1:3 and so this is undesirable, while in those cases where the mol ratio exceeds 3:1 the water resistance of the hardened paint film is reduced and so this is undesirable.

The (A) or (C) component hydroxyl group containing vinyl based copolymer has the hydroxyl groups arranged in locations displaced from the main chain by soft segments and so crosslinking bonds which are flexible are formed by crosslinking such a copolymer with a carbamic acid ester based hardening agent which can be represented by the aforementioned general formula (2) which is the (B) component. Consequently, the hardened paint films which are obtained have excellent scratching resistance. Furthermore, the crosslinking bonds which are formed with a carbamic acid ester based hardening agent are chemically stable and so they have excellent acid resistance and weather resistance. Moreover, the carbamic acid ester (B) does not cause yellowing of the paint film.

Other hardening components which can react with hydroxyl groups, as well as the (B) component, can also be compounded as auxiliary crosslinking components in a paint composition of this invention. Blocked isocyanate resin, amino resin, melamine resin, silanol resins and alkoxysilane resins, for example, can be cited as other hardening agent components which can react with hydroxyl groups. However, it is desirable for realizing satisfactorily the effect of this invention that the other hardening component is included in an amount of less than 20 wt % of the total resin solid fraction, and in those cases where blocked isocyanate resins are compounded as auxiliary crosslinking components in particular it is desirable that the amount should be less than 15 wt % in consideration of the yellowing of the paint film.

Furthermore, hardening catalysts other than the abovementioned components can be compounded in a paint composition of this invention in order to obtain hardened paint films more efficiently. Examples of hardening catalysts include tin based catalysts such as dibutyltin dilaurate, dibutyltin diacetate and tin octanoate; sulfonic acid based catalysts such as p-toluenesulfonic acid, dodecylbenzenesulfonic acid, dinonylnaphthalenesulfonic acid and dinonylnaphthalenedisulfonic acid; and also phosphoric acid based catalysts and carboxylic acid based catalysts, and one type can be used alone or mixtures of two or more types can be used.

Moreover, the additives which are used conventionally in paints, including colorants such as pigments and dyes, pigment dispersants, viscosity adjusting agents, anti-run agents, leveling agents, anti-gelling agents, ultraviolet absorbers and radical scavengers, for example, can also be added to a paint composition of this invention, as required, within ranges such that the purpose of the invention is not lost.

Paint compositions of this invention can be manufactured by mixing the aforementioned (A) and (B) components, or the (C) and (B) components, and the other components, as required.

The paint compositions of this invention can be compounded with colored pigments, metallic pigments, dyes or physical pigments, for example, and used as colored paints (solid color finish) or metallic paints for example. Furthermore, they can also be used as clear paints in which little or no pigment is compounded.

No particular limitation is imposed upon the objects which can be painted with a paint comprising a paint composition of this invention, and it is possible to paint metals, such as steel sheets and surface treated steel sheets, and plastics, for example, and they can be used to paint directly onto these materials or they can be painted as top-coat paints onto painted surfaces where a primer or a primer/mid-coat paint has been applied to the material which is to be painted. In practical terms, they can be used as top-coat paints for automobiles and other vehicles, buildings and structures for example.

A film thickness of some 10 to 60 μm as a dry film thickness is preferred, and the preferred baking conditions for hardening the paint film are a temperature of from about 100° C. to about 180° C. and a time of some 10 to 120 minutes.

Paints comprising a paint composition of this invention can be used for one-coat one-bake painting, two-coat one-bake painting, three-coat two-bake painting or three-coat one-bake painting for example, and they can be painted using the normal methods of painting, for example air spray painting, airless spray painting, electrodeposition painting or dip painting, to provide the aforementioned dry film thickness, and a hardened paint film can be formed under the aforementioned baking conditions. In those cases where the paints comprising a paint composition of this invention are used as top coat clear paints, any type of paint, such as a solvent based paint, a high-solid paint or a water based paint for example, can be used for the colored base coat.

The hydroxyl group containing vinyl based copolymers which are used for the main resin in this invention have the hydroxyl groups arranged in locations displaced from the main chain by soft segments and the crosslinking bonds which are formed with the carbamic acid ester based hardening agent are flexible and chemically stable. Moreover, the carbamic acid esters represented by general formula (2) do not cause yellowing of the paint film.

The heat-hardenable paint composition of this invention contains specified amounts of the abovementioned hydroxyl group containing vinyl based copolymers and hardening agents and so it is possible to form paint films which have excellent scratching resistance, acid resistance, yellowing resistance and weather resistance.

The invention is described in more detail below by means of examples of manufacture, illustrative examples and comparative examples, but the invention is not limited in any way by these examples.

Manufacture of Vinyl Based Copolymers

EXAMPLE OF MANUFACTURE 1

Xylene (370 parts by weight) was introduced into a four-necked flask which had been fitted with a thermometer, a stirrer, a reflux condenser and a dropping funnel and the temperature was raised to 140° C. Next, a mixture of which the composition is indicated below was added dropwise from the dropping funnel at a constant rate over a period of 2 hours. After completing the drip feed, the mixture was maintained at the reflux temperature for a period of 1 hour and then the contents of the flask were cooled to 100° C. Then, 2 parts by weight of tert-butylperoxy-2-ethylhexanoate and 10 parts by weight of xylene were added and, by maintaining at a temperature of 100° C., with stirring, for a period of 2 hours, the (A) component hydroxyl group containing vinyl based copolymer solution A-1 of residue on heating 60%, resin hydroxy group value 100 mg KOH/g and weight average molecular weight 10,000 was obtained.

| | |
|---|---|
| Praxel FM-1 *1 | 261 parts by weight |
| 2-Ethylhexyl methacrylate | 39 parts by weight |
| n-Butyl methacrylate | 300 parts by weight |
| tert-Butyl peroxybenzoate | 20 parts by weight |

*1 Praxel FM-1: Trade name of a compound of the aforementioned general formula (1) in which $X^1$ is a methyl group, $X^2$ and $X^3$ are hydrogen atoms, j is 0, m is 5 and n is 1, manufactured by the Daiseru Kagaku Co.

EXAMPLE OF MANUFACTURE 2

Xylene (370 parts by weight) was introduced into a four-necked flask which had been fitted with a thermometer, a stirrer, a reflux condenser and a dropping funnel and the temperature was raised to 140° C. Next, a mixture of which the composition is indicated below was added dropwise from the dropping funnel at a constant rate over a period of 2 hours. After completing the drip feed, the mixture was maintained at the reflux temperature for a period of 1 hour and then the contents of the flask were cooled to 100° C. Then, 2 parts by weight of tert-butylperoxy-2-ethylhexanoate and 10 parts by weight of xylene were added and, by maintaining at a temperature of 100° C., with stirring, for a period of 2 hours, the (A) component hydroxyl group containing vinyl based copolymer solution A-2 of residue on heating 60%, resin hydroxy group value 150 mg KOH/g and weight average molecular weight 10,000 was obtained.

| | |
|---|---|
| 4-Hydroxybutyl acrylate | 232 parts by weight |
| 2-Ethylhexyl methacrylate | 240 parts by weight |
| n-Butyl methacrylate | 128 parts by weight |
| tert-Butyl peroxybenzoate | 20 parts by weight |

EXAMPLE OF MANUFACTURE 3

Xylene (370 parts by weight) was introduced into a four-necked flask which had been fitted with a thermometer, a stirrer, a reflux condenser and a dropping funnel and the temperature was raised to 140° C. Next, a mixture of which the composition is indicated below was added dropwise from the dropping funnel at a constant rate over a period of 2 hours. After completing the drip feed, the mixture was maintained at the reflux temperature for a period of 1 hour and then the contents of the flask were cooled to 100° C. Then, 1 part by weight of tert-butylperoxy-2-ethylhexanoate and 10 parts by weight of xylene were added and it was maintained at a temperature of 100° C., with stirring, for a period of 2 hours.

| | |
|---|---|
| 2-Hydroxyethyl methacrylate | 139 parts by weight |
| Methyl methacrylate | 80 parts by weight |
| isobutyl methacrylate | 15 parts by weight |
| tert-Butyl peroxybenzoate | 5 parts by weight |

Next, 3 parts by weight of dibutyltin dilaurate and 11 parts by weight of xylene were added, and then 366 parts by weight of ε-caprolactam were added dropwise from the dropping funnel at a constant rate over a period of 1 hour.

After the drip feed had been completed, the reaction was continued at a temperature of 100° C. and the reaction was completed when the residue on heating reached 60%, and the (C) component hydroxyl group containing vinyl based copolymer solution C-1 of resin hydroxyl group value was 100 mg KOH/g and weight average molecular weight 20,000 was obtained.

EXAMPLE OF MANUFACTURE 4

Xylene (370 parts by weight) was introduced into a four-necked flask which had been fitted with a thermometer, a stirrer, a reflux condenser and a dropping funnel and the temperature was raised to 140° C. Next, a mixture of which the composition is indicated below was added dropwise from the dropping funnel at a constant rate over a period of 2 hours. After completing the drip feed, the mixture was maintained at the reflux temperature for a period of 1 hour and then the contents of the flask were cooled to 100° C. Then, 2 parts by weight of tert-butylperoxy-2-ethylhexanoate and 10 parts by weight of xylene were added and, by maintaining at a temperature of 100° C., with stirring, for a period of 2 hours, the hydroxyl group containing vinyl based copolymer solution a-4 of residue on heating 60%, resin hydroxy group value 100 mg KOH/g and weight average molecular weight 10,000 was obtained.

| 2-Hydroxyethyl methacrylate | 139 parts by weight |
|---|---|
| 2-Ethylhexyl methacrylate | 411 parts by weight |
| n-Butyl methacrylate | 50 parts by weight |
| tert-Butyl peroxybenzoate | 20 parts by weight |

Illustrative Examples 1 to 5 a) Preparation of Clear Paints

Clear paints of the compositions shown in Table 1 were prepared and diluted to the painting viscosity (Ford Cup #4, 25 seconds at 20°) using a thinner ["Sorbesso #100 (trade name, aromatic hydrocarbon of boiling point 150–170° C. manufactured by the Esso Co.)/n-butanol=8/2 by weight] and used to form the paint films indicated below.

b) Formation of Paint Films

Cationic electrodeposition paint ("Aqua No.4200", trade name, manufactured by the Nippon Yushi Co.) was electrodeposition painted onto zinc phosphate treated mild steel sheet to a dry film thickness of 20 μm and then baked at a temperature of 175° C. for 25 minutes, and then a mid-coat paint ("Hiepico No.100 White", trade name, manufactured by the Nippon Yushi Co.) was spray painted in such a way as to provide a dry film thickness of 40 μm and baked at 140° C. for 30 minutes and a mid-coat painted sheet was obtained.

In Examples 1 to 4, a solvent type base-coat paint ("Belcoat No.6000 White", trade name, manufactured by the Nippon Yushi Co.) was air spray painted into this mid-coat painted sheet to a dry film thickness of 20 μm and then set for 5 minutes at room temperature, and then each of the aforementioned clear paints prepared in a) was air spray painted in such a way as to provide a dry film thickness of 40 μm and then baked at 140° C. for 30 minutes.

On the other hand, in Example 5 a water based base-coat paint (a white based paint prepared using titanium oxide for the pigment using the same method as that disclosed in Example 1 of Japanese Patent Kokai H8-10690 (1996)) was air spray painted onto similar electrodeposition/mid-coat painted sheet to that described above so as to provide a dry film thickness of 20 μm and, after flashing for 10 minutes at 80° C., the aforementioned clear paints prepared in a) were air spray painted in such a way as to provide a dry film thickness of 40 μm and baked at 140° C. for 30 minutes.

Moreover, specimens were obtained by the direct painting of the clear coat paint onto "Hiepico No.100 Black" (trade name, manufactured by the Nippon Yushi Co.) for the scratching resistance tests of Examples 1 to 5.

On carrying out each of the tests shown in Table 3 with the sheets obtained as samples, all of the examples shown in Table 3 exhibited excellent scratching resistance, acid resistance, yellowing resistance and weather resistance.

Comparative Examples 1 and 2 a) Preparation of Clear Paints

The clear paints of the compositions shown in Table 2 were prepared and diluted to the painting viscosity (Ford Cup #4, 25 seconds at 20°) using a thinner ["Sorbesso #100 (trade name, aromatic hydrocarbon of boiling point 150–170° C., manufactured by the Esso Co.)/n-butanol=8/2 by weight] and used to form the paint films indicated below.

b) Formation of Paint Films

In the same way as in Examples 1 to 4, solvent type base-coat paint ("Belcoat No.6000, White", trade name, manufactured by the Nippon Yushi Co.) was air spray painted to provide a dry film thickness of 20 μm onto cationic electrodeposition/mid-coat painted sheet and, after setting for 5 minutes at room temperature, each of the aforementioned clear paints prepared in a) was air spray painted so as to provide a dry film thickness of 40 μm and baked at 140° C. for 30 minutes.

The paint film performance was investigated using the specimens obtained. The results are shown in Table 3.

TABLE 1

(Amount Compounded, Units: Part by Weight)

| | Example | | | | |
|---|---|---|---|---|---|
| | 1 | 2 | 3 | 4 | 5 |
| A-1 *1 | 44.2 | 74.9 | — | — | 74.9 |
| A-2 *2 | — | — | — | 79.6 | — |
| C-1 *3 | — | — | 44.2 | — | — |
| a-4 *4 | — | — | — | — | — |
| B-1 *5 | 53.7 | 22.8 | 53.7 | 18.1 | 22.8 |
| b-2 *6 | — | — | — | — | — |
| Tinuvin 384 *7 | 1.0 | 1.1 | 1.0 | 1.2 | 1.1 |
| Tinuvin 292 *8 | 0.5 | 0.6 | 0.5 | 0.6 | 0.6 |
| DBTDL *9 | 0.3 | 0.3 | 0.3 | 0.3 | 0.3 |
| BYK 306 *10 | 0.3 | 0.3 | 0.3 | 0.2 | 0.3 |
| TOTAL | 100.0 | 100.0 | 100.0 | 100.0 | 100.0 |
| OH group: NHCOOR *11 | 1:2 | 1:1 | 1:2 | 2:1 | 1:1 |
| Base-Coat | ST | ST | ST | ST | WB |

ST: Solvent Type, WB: Water Based

TABLE 2

(Amount Compounded, Units: Part by weight)

| | Comparative Example | |
|---|---|---|
| | 1 | 2 |
| A-1 *1 | — | 65.0 |
| A-2 *2 | — | — |
| C-1 *3 | — | — |
| a-4 *4 | 74.9 | — |
| B-1 *5 | 22.8 | — |
| b-2 *6 | — | 33.5 |
| Tinuvin 384 *7 | 1.1 | 0.7 |

TABLE 2-continued (Amount Compounded, Units: Part by weight)

| | Comparative Example | |
|---|---|---|
| | 1 | 2 |
| Tinuvin 292 *8 | 0.6 | 0.4 |
| DBTDL *9 | 0.3 | 0.3 |
| BYK 306 *10 | 0.3 | 0.1 |
| TOTAL | 100.0 | 100.0 |
| OH group: NHCOOR *11 | 1:1 | |
| Base-Coat | Solvent Type | Solvent Type |

Notes for Tables 1 and 2
*1 A-1: Vinyl based copolymer solution A-1 of Example of Manufacture 1
*2 A-2: Vinyl based copolymer solution A-2 of Example of Manufacture 2
*3 C-1: Vinyl based copolymer solution A-3 of Example of Manufacture 3
*4 a-4: Vinyl based copolymer solution a-4 of Example of Manufacture 4
*5 B-1: n-Butanol solution of 2,4,6-tris(butoxycarbonylamino)-1,3,5-triazine, this compound has been disclosed in Japanese Pat. Kokai H6-228305 (1994).
*6 b-2: Blocked isocyanate (HDI) manufactured by the Sumitomo Bayer Urethane Co., blocked isocyanate for which the isocyanate groups of hexamethylenedi-isocyanate have been blocked with an oxime derivative, Desmodure BL-3175, manufactured by the Sumitomo Bayer Urethane Co., trade name, NCO % = 11.1%, solid fraction 75%.
*7 Tinuvin 384: Trade name, manufactured by the Ciba Geigy Co., a benzotriazole based ultraviolet absorber
*8 Tinuvin 292: Trade name, manufactured by the Ciba Geigy Co., a hindered amine based radical scavenger.
*9 DBTDL: Dibutyltin dilaurate
*10 BYK 306: A leveling agent, BYK 306 manufactured by the Bikkemy Co. (trade name)
*11 OH group: NHCOOR This shows the mol ratio of hydroxyl groups originating from the (A) component: NHCOOR groups originating from the (B) component in the paint composition.

TABLE 3

| | Examples | | | | | Comparative Examples | |
|---|---|---|---|---|---|---|---|
| | 1 | 2 | 3 | 4 | 5 | 1 | 2 |
| Scratching *1 Resistance | ○ | ○ | ○ | ○ | ○ | X | ○ |
| Acid *2 Resistance | ○ | ○ | ○ | ○ | ○ | ○ | ○ |
| Pencil *3 Hardness | H | H | H | H | H-F | H | H |
| Yellowing *4 Resistance | ○ | ○ | ○ | ○ | ○ | ○ | X |
| Accelerated *5 Weather Resistance | ○ | ○ | ○ | ○ | ○ | X | ○ |

Notes for Table 3
*1 Scratching Resistance: Muddy water (JIS Z-8901-84, a mixture of type 8 dust/water/neutral detergent = 10/99/1 by weight) was coated with a brush onto the sample and then the sample was washed with the washing wheel brush in an automobile washer at 150 rpm for 10 seconds and rinsed with running water. This operation was repeated twice and the extent of scratching of the sample surface was observed visuals.
○: Hardly any scratching to be seen
Δ: Slight scratching was seen
X: Pronounced scratching was seen
*2 Acid Resistance: After placing 0.2 ml of 40 wt % aqueous sulfuric acid solution in the form of a spot on the sample it was heated to 60° C. for 15 minutes and then rinsed with water, and the extent of marking was assessed visually.
○: No abnormality
X: Water mark present
*3 Pencil Hardness: Pencil scratching tests were carried out in accordance with JIS K5400 ((1992) 8.4.2) in a constant temperature, constant humidity room at 20° C. and 75% RH.

TABLE 3-continued

| | Examples | | | | | Comparative Examples | |
|---|---|---|---|---|---|---|---|
| | 1 | 2 | 3 | 4 | 5 | 1 | 2 |

*4 Yellowing Resistance: After coating the clear coat paint onto the base coat paint to a fixed film thickness (40 μm) using a wet-on-wet system, the sample was baked for 90 minutes at 160° C. and the state of yellowing of the paint film was observed visually.
○: Hardly any yellowing of the paint film to be seen
X: Pronounced yellowing of the paint film
*5 Accelerated Weather Resistance: The gloss, color change and staining of the paint film were assessed visually after testing samples for 3,000 hours with a Sunshine Carbon Arc Lamp (JIS K-5400 (1990) 9.8.1). The evaluation was made with the standards indicated below.
○: Virtually no change to be seen in the paint film.
X: Water staining and color changes seen on the paint surface, and a marked lowering of the gloss.

It is clear from the results shown in Table 3 that the paint films of Examples 1 to 5 all had excellent scratching resistance, acid resistance, hardness, yellowing resistance and weather resistance.

On the other hand, no hydroxyl group containing vinyl based monomer which could be represented by the aforementioned general formula (1) was used in Comparative Example 1 and so the scratching resistance was poor.

Furthermore, a blocked isocyanate was used for the hardening agent in Comparative Example 2 and so the yellowing resistance was poor.

What is claimed is:

1. A heat-hardenable paint composition comprising (A) a vinyl based copolymer having a hydroxyl group value from 20 to 200 mg KOH/g, and comprising from 5 to 70 wt % hydroxyl group containing vinyl based monomer (a-1) of the formula (1)

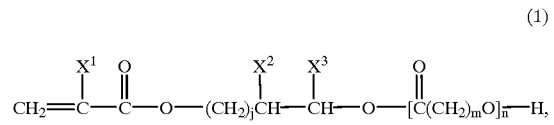

(1)

wherein $x^1$, $x^2$ and $x^3$ each independently represent a hydrogen atom or a methyl group, j is an integer from 0 to 2, m is an integer of from 3 to 5, n is an integer of from 1 to 5, and from 95 to 30 wt % other vinyl based monomer (a-2), and (B) 1,3,5-triazine-2,4,6-triscarbamic acid ester of the formula

or an oligomer thereof, wherein R may be the same or different and is selected from the group consisting of an alkyl group of from 1 to 20 carbon atoms, an aryl group of from 6 to 20 carbon atoms, an aralkyl group which has from 7 to 20 carbon atoms, and mixtures thereof, wherein the mol ratio of hydroxyl groups originating from (A) component: NHCOOR groups originating from (B) component in the composition is from 1:3 to 3:1.

2. A heat-hardenable paint composition, comprising (C) a vinyl based copolymer having a hydroxyl group value from 20 to 200 mg KOH/g, and comprising from 5 to 70 wt % structural units (c-1) of formula:

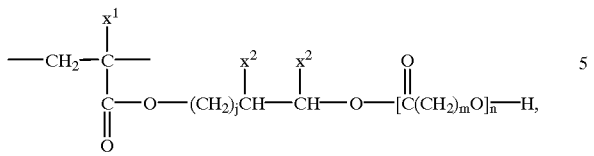

wherein $x^1$, $x^2$ and $x^3$ are each independently hydrogen or a methyl group, j is an integer of from 0 to 2, m is an integer of from 3 to 5, n is an integer of from 1 to 5, from 95 to 30 wt % other structural units (c-2) derived from vinyl based monomer, and (B) 1,3,5-triazine-2,4,6-triscarbamic acid ester of the formula $$C_3N_3(NHCOOR)_3$$

or an oligomer thereof, wherein R may be the same or different and is selected from the group consisting of an alkyl group of from 1 to 20 carbon atoms, an aryl group of from 6 to 20 carbon atoms, an aralkyl group which has from 7 to 20 carbon atoms, and mixtures thereof, wherein the mol ratio of hydroxyl groups originating from (C) component: NHCOOR groups originating from (B) component in the composition is from 1:3 to 3:1.

* * * * *